United States Patent
Nadig et al.

(10) Patent No.: US 10,387,223 B2
(45) Date of Patent: Aug. 20, 2019

(54) PROCESSING APPLICATION PROGRAMMING INTERFACE (API) QUERIES BASED ON VARIABLE SCHEMAS

(71) Applicant: INTUIT INC., Mountain View, CA (US)

(72) Inventors: Deepak Nadig, Mountain View, CA (US); Jayanth Saimani, Bangalore (IN); Rajat Khare, Bangalore (IN); Vishwanath Ranganath, Bangalore (IN)

(73) Assignee: INTUIT INC., Mountain View, CA (US)

(*) Notice: Subject to any disclaimer, the term of this patent is extended or adjusted under 35 U.S.C. 154(b) by 144 days.

(21) Appl. No.: 15/399,257

(22) Filed: Jan. 5, 2017

(65) Prior Publication Data

US 2018/0121261 A1     May 3, 2018

(30) Foreign Application Priority Data

Oct. 31, 2016 (IN) .............................. 201631037286

(51) Int. Cl.
*G06F 9/54* (2006.01)
*G06F 16/21* (2019.01)
*G06F 8/36* (2018.01)

(52) U.S. Cl.
CPC ................ *G06F 9/541* (2013.01); *G06F 8/36* (2013.01); *G06F 16/212* (2019.01)

(58) Field of Classification Search
None
See application file for complete search history.

(56) References Cited

U.S. PATENT DOCUMENTS

| | | | |
|---|---|---|---|
| 7,539,747 | B2 | 5/2009 | Lucovsky et al. |
| 9,396,228 | B2 * | 7/2016 | Corbett |
| 2003/0079051 | A1 | 4/2003 | Moses et al. |
| 2008/0208785 | A1 * | 8/2008 | Trefler |
| 2011/0307490 | A1 | 12/2011 | Chow |
| 2014/0074806 | A1 * | 3/2014 | Koren |
| 2016/0098261 | A1 | 4/2016 | Habib et al. |

OTHER PUBLICATIONS

PCT/US2017/057374, International Search Report dated Jan. 16, 2018, 15 pages.
PCT/US2017/057343, International Search Report dated Jan. 31, 2018, 14 pages.
PCT/US2017/057409, International Search Report dated Feb. 1, 2018, 14 pages.
Ralph Mietzner et al., "Combining Different Multi-tenancy Patterns in Service-Oriented Applications," Enterprise Distributed Object Computing Conference, 2009. EDOC '09, IEEE International, IEEE, Sep. 2009, 10 pages.

* cited by examiner

*Primary Examiner* — Syed A Roni
(74) *Attorney, Agent, or Firm* — Patterson + Sheridan, LLP

(57) ABSTRACT

The present disclosure relates to accessing data using application programming interface (API) calls. According to one embodiment, a method generally includes receiving, at the API, a request from a client device, where the requesting a data operation. Determining context data associated with the request. Receiving an entity schema based on the context data, where the entity schema includes a metamodel. Processing the request using the entity schema and metamodel, generating a response including the entity schema, and returning the response to the client device.

20 Claims, 7 Drawing Sheets

FIGURE 3

```
                                                                        240
        classification: "public"
        lifecycle: "R1"
        provider:
242       service: "indirect-taxes"
          read: true
          update: true
        description: |
          Tax agency allOf:
          -
            "$ref": "/Entity"
          -
244 ──    properties:
            code:
248 ──        type: string
              description: Tax agency code
246 ──      name:
              type: string
              description: Tax agency name
            taxOnPurchase:
              type: boolean
              description: Is tax on purchase applicable
              default: false
            displayName:
              type: string
              description: Tax agency display name
            taxOnSale:
              type: boolean
              description: Is tax on sale applicable
              default: true
            taxOnPurchaseReclaimable:
              type: boolean
              description: Is purchase tax reclaimable
              default: false
            registrationNumber:
              type: string
              description: Tax registration number
            additionalRegistrationNumber:
              type: string
              description: Additional tax registration number
              variable: true
```

FIGURE 4

```
         ┌ classification: "public"                    ⟋240
         │ lifecycle: "R1"
         │ provider:
   242 ─┤    service: "indirect-taxes"
         │    read: true
         │    update: true
         │ description: |
         └   Tax agency allOf:
           -
             "$ref": "/Entity"
   244 ──────── properties:
                  code:
   248 ─────────── type: string
                   description: Tax agency code
   246 ────── name:
                  type: string
                  description: Tax agency name
                taxOnPurchase:
                  type: boolean
                  description: Is tax on purchase applicable
                  default: false
                displayName:
                  type: string
                  description: Tax agency display name
                taxOnSale:
                  type: boolean
                  description: Is tax on sale applicable
                  default: true
                taxOnPurchaseReclaimable:
                  type: boolean
                  description: Is purchase tax reclaimable
                  default: false
                registrationNumber:
                  type: string
                  description: Tax registration number
                additionalRegistrationNumber:
                  type: string
                  description: Additional tax registration number
                  variable: true
   400 ──────── taxAgencyMetaModel:
                  "$ref" : "/indirecttaxes/TagencyMetaModel"
```

PROCESSING APPLICATION PROGRAMMING INTERFACE (API) QUERIES BASED ON VARIABLE SCHEMAS

CROSS-REFERENCE TO RELATED APPLICATIONS

This application claims benefit of India Provisional Patent Application Serial No. 201631037286, entitled "Processing Application Programming Interface (API) Queries Based on Variable Schemas," filed Oct. 31, 2016, which is assigned to the assignee hereof and the contents of which are hereby incorporated by reference.

BACKGROUND

Field

Embodiments presented herein generally relate to supporting variability in an application programming interface (API), and more specifically to processing API function calls based on variable schemas associated with a context in which the API function call is invoked.

Description of the Related Art

Application programming interfaces (APIs) generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, using a Representational State Transfer function call (a RESTful function call), queries encapsulated in an HTTP POST request, a Simple Object Access Protocol (SOAP) request, or other protocols that allow client software to invoke functions on a remote system.

In some cases, such as software systems that are used globally and are subject to different operational requirements for different variability dimensions, (like geographical regions, industries, business types or business sizes), the operational requirements for those variability dimensions may be hard-coded in application source code. API client applications (like user interfaces) generally use functionality exposed by the API to retrieve data from a service and format the data according to rules implemented in source code or format data according to the rules implemented in source code and submit the formatted data to the data service to be committed to a persistent data store. For example, in an invoice generation workflow, the format of an invoice identifier, tax rates applicable to provided goods and services, tax authorities that impose taxes on goods and services, required information in an invoice, and so on may differ based on a jurisdiction in which the organization that generates the invoice is located. As the operational requirements change due to regulations or other variability dimensions, the source code is generally changed to reflect the changed operational requirements (e.g., changes in tax rates, goods and/or services to which tax is applied, changes in tax authorities, and so on). Because changes in operational requirements generally entail changes to application source code, supporting variability in an application may require that developers debug the application source, recompile the application, and provide update packages to application users.

Additionally, to support new variations in a workflow (e.g., new jurisdictions for an invoice generation workflow), developers generally need to generate application source code to support a workflow according to the operational requirements for the new variation of the workflow. Generating new application source code is a time-intensive process and may entail duplicating large amounts of source code. As the number of supported variations of the workflow—and the corresponding code base to support the variations of the workflow—increases, the amount of code to maintain increases. These increases in the amount of code to maintain may increase the amount of work required to maintain and update an application.

SUMMARY

One embodiment of the present disclosure includes a method for providing data services through an API by receiving, at the API service, a request from a client device for a data operation. The API service determines the context data (includes variability dimensions) associated with the request. The API service receives the entity schema including a metamodel based on the context data of the user. The API service processes the request using the entity schema to generate a response including the entity schema, and returns the response to the client device.

Another embodiment provides a computer-readable storage medium having instructions, which, when executed on a processor, operates to receive, at an API service, a request from a client device for a data operation. The API service determines context data associated with the request. The API service receives an entity schema including a metamodel based on the context data. The API service processes the request using the entity schema, generates a response including the entity schema, and returns the response to the client device.

Still another embodiment of the present invention includes a processor and a memory storing a program, which, when executed on the processor, performs an operation for receiving, at an API service, a request from a client device for a data operation. The API service determining context data associated with the request. The API service receiving an entity schema including a metamodel based on the context data. The API service processes the request using the entity schema to generate a response including the entity schema, and returns the response to the client device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3 illustrates an example entity schema, according to one embodiment.

FIG. 4 illustrates an example entity schema with a metamodel, according to one embodiment.

DETAILED DESCRIPTION

Figure 1:
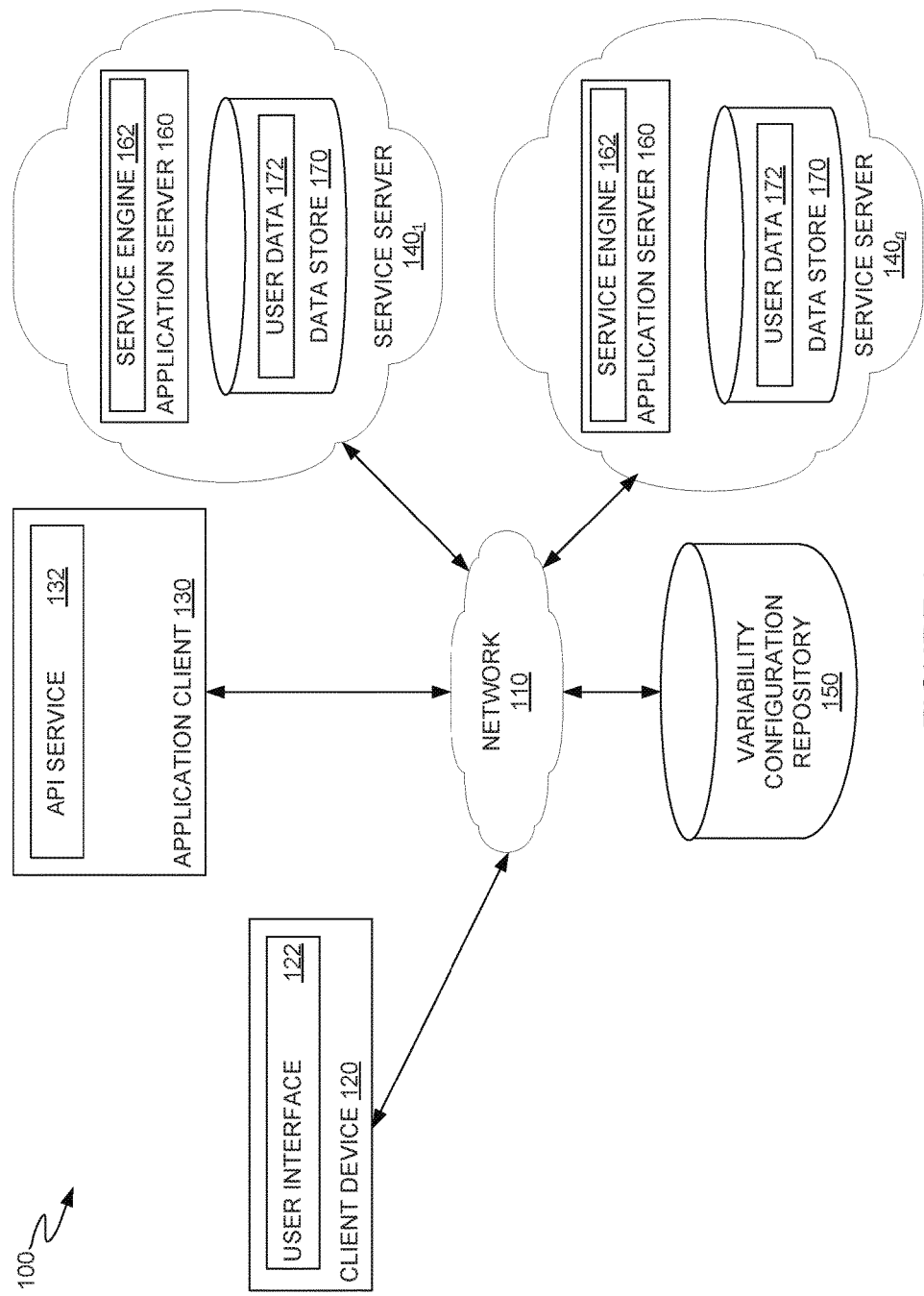
FIG. 1 illustrates an example computing environment, according to one embodiment.

Application programming interfaces (APIs) generally expose methods and procedures that software developers can use to build software applications using features provided by a software system. These features may include, for example, database interaction, data processing, and so on. APIs generally define a set of inputs for an application to provide for processing and a set of outputs generated by the application in response to the inputs. When an application invokes an API function call to retrieve data for display to a user, the application can receive unformatted data (e.g., as a set of strings) and format the strings according to the source code associated with a particular variation of a workflow (e.g., an invoice generation workflow for a particular jurisdiction). When an application invokes an API function call to write data to a data repository, the application can receive unformatted data from a user and verify the data against rules in the source code associated with a particular version of a workflow. If the application determines that the data complies with hard-coded rules in the application source code for a particular version of a workflow, the application can invoke an API function to commit the data to the data repository. Otherwise, based on hard-coded rules in the application source code, the application can generate alerts to inform a user that the inputted data does not comply with the rules established for the version of the workflow.

Typically, enabling an application to process multiple variations of a workflow (e.g., generating invoices according to taxation rules for different jurisdictions) involves maintaining independent code bases for each variation of the workflow. As discussed, maintaining independent code bases for each variation of the workflow increases the amount of code to be modified to support needs of additional variability dimensions. Additionally, when the processing rules for a particular variation of a workflow change (e.g., in a taxation example changing the name and applied tax rate of a tax agency), application source code may need to be recompiled, which is a computationally expensive process, and distributed to users, which can be problematic.

Embodiments presented here describe a method and system including an API service and variability configuration repository that manage the variability dimensions for individual users without hard coding logic for each variation in the main program code base. The API service handles a request from a user by extracting context data from the request and obtaining an entity schema defining the properties of an entity and any constrains the user applies to that entity. The variability configuration repository includes a collection of entity schemas where each schema represents a specific variability dimension configuration. The variability configuration repository matches context data from the API service to one of the variability dimension configurations to identify the entity schema needed for the user request. The variability configuration repository inserts a metamodel into the entity schema that is used to represent user specific constraints. The API service uses the entity schema and metamodel to interact with other system components, such as services, partners applications and the user interface application to complete user requests. New workflow requirements can be added to the system including additional entity schemas and metamodels to the variability configuration repository or by modifying existing schemas. The API service uses the entity schema and metamodel to perform the actions requested by the user and to communicate the results using a user interface.

FIG. 1 illustrates an example computing environment system 100 for providing software services in a multi-workload environment. System 100 includes a communications network 110, a client device 120, an application client 130, one or more service servers 140 and a variability configuration repository (VCR). Users access system 100 from a client device 120 running an application providing a user interface 122. User interface 122 receives user input, generates a request from the user input, and transmits the request through network 110 to application client 130.

Application client 130 receives a request from a user interface 122, processes the request using an API service 132, which communicates with the variability configuration repository 150 and a service server 140 to generate a variability construct that is sent to client device 120 and displayed to the user through the user interface 122.

Figure 2:
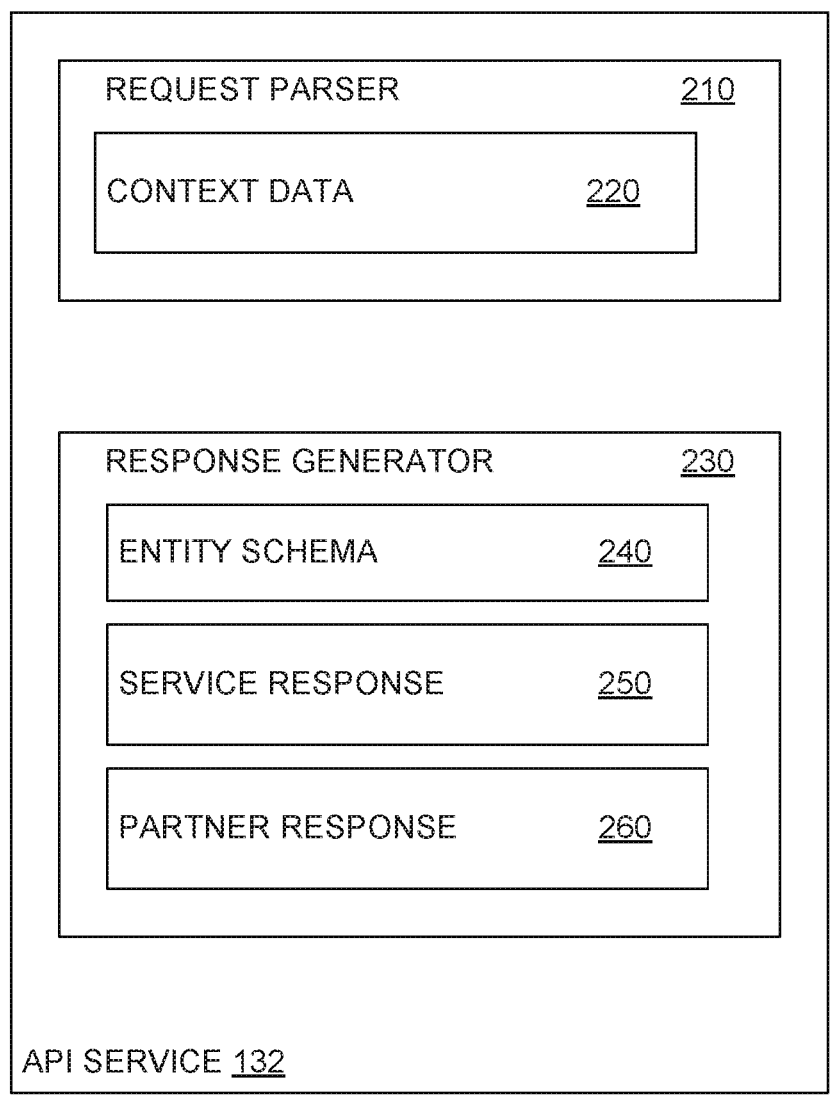
FIG. 2 illustrates an example an application programming interface (API) service, according to one embodiment.

An embodiment of API service 132 is illustrated in FIG. 2. As shown, API service 132 includes a request parser 210 configured to generate context data 220, and a response generator 230 configured to receive an entity schema 240, a service response 250, and in some cases, a partner response 260. Response generator 230. Request parser 210 receives the user request and extracts context data 220 from the request. Context data 220 includes, by way of example, information associated with the user submitting the request, such as a user id, user authentication credentials, business department and user permissions, and information about the client entity itself, such as account id, geographic location, industry, or size. Request parser 210 may communicate with one or more data stores to obtain one or more pieces of information related to the request when generating the context data 220. Request parser 210 provides the context data 220 to the VCR 150.

VCR 150 contains a collection of entity schemas 240 representing the individual variability constructs in system 100. FIG. 3 illustrates an example entity schema 240, according to one embodiment of the invention. The entity schema 240 may include a description 242 of the entity, data fields 244, descriptions for fields 246, and data types 248. Each entity schema 240 is associated with a set of variability dimensions that distinctly identifies an individual entity schema 240 from other entity schemas in the collection. Administrators can modify or extend the functionality of the system 100 using the VCR 150 by modifying elements of existing schemas or by adding new entity schemas to the collection. For example, the entity schema 240 illustrated in FIG. 3 could be modified to include a new data field 244 in response to a workflow change requiring tax for usage of certain goods. In this example, a new data field 244 "taxOnUse" could be added, with a data type 248 of "Boolean" and a description 246 of "Is tax on use applicable."

VCR 150 uses the context data 220 to identify an entity schema 240 required by the user request by matching the context data 220 to a set of variability dimensions. As illustrated in FIG. 4A, VCR 150 injects a metamodel 400 into the entity schema 240 after the entity schema 240 is identified. Metamodel 400 includes additional rules about the data fields 244 in the entity schema 240, permissible actions, or both. The metamodel 400 extends the entity schema 240 to include constraints for a specific user. The metamodel 400 can indicate whether a data field 244 in the entity schema 240 is applicable to the specific user by including an "enabled" constraint. For example, a metamodel for a "tax agency" can indicate whether the "tax on sale", (i.e., sales tax) field in the entity applies for this user. If the tax agency applicable to this specific user levies a sales tax, then the metamodel 400 would have the "tax on sale" set to true, if not, false.

The metamodel 400 can indicate whether the data field 244 is required, such as, by way of example, the metamodel 400 for a "sales receipt" entity can include a "required" field describing a "transaction date" data field in the "sales receipt." When the "required" field in the metamodel is set as "true," a value must be present in the "transaction date" for the entity to be valid for this user. The metamodel 400 can include default settings for data fields 244 of the entity schema 240. For example, the "sales receipt" entity can have a "discount" data field 244 representing price adjustments for sales or promotions. The metamodel 400 for the "discount" data field 244 would include a "default" field set to "false" indicating that new instances of the "sales receipt" entity would not include a "discount" data field unless the user chooses to enable that field.

The metamodel 400 can include validation constraints for each data field 244. For instance, an entity schema 240 for an invoice could define an "account number" data field 244 with an "integer" data type 248. A first user may allow account numbers to be any type of integer, while a second user may require account numbers to be between six and twelve digits. The second user's requirement that the "integer" in the "account number" field be between six and twelve digits is included in the metamodel 400 describing the "account number" field.

Figure 5:
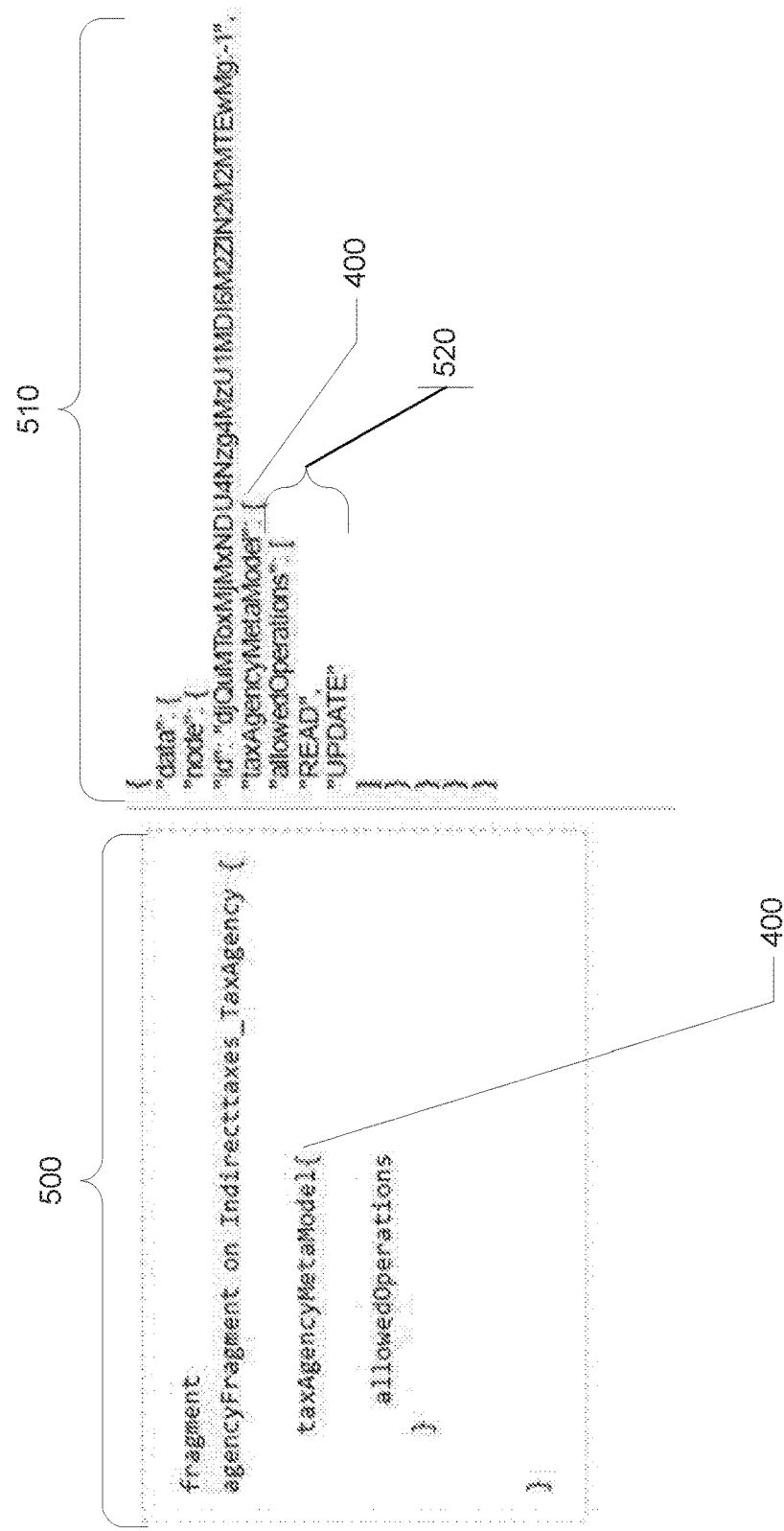
FIG. 5 illustrates an example request and response including a metamodel, according to one embodiment.

FIG. 5 illustrates a request 500 including permissions included in metamodel 400, and response 510 that includes the permissions as a list of allowed operations 520 that can be performed on the "Tax Agency" entity. FIG. 5 includes "READ" and "UPDATE" as the allowed operations 520, but the metamodel 400 for another user may include "CREATE" as an allowed operation 520. The metamodel 400 can also include workflow rules constraining how a job or activity should be executed. Thus, the VCR 150 can represent a large variety of user specific workflows by applying a user specific metamodel 400 to a user independent entity schema 240.

Metamodel 400 is also used communicate the metadata information to the user interface 122 to properly render data and to interpret data input properly. For instance, a user generating an invoice can freely edit many data fields 244, such as, for example "discount percentage," but a user cannot edit "discount percentage" the data field 244 for an invoice that has already been sent. In this instance, Metamodel 400 would contain a Boolean metadata field "editable," "readonly" or the like, describing the "discount percentage" field in the entity schema 240. In the "editable" instance the Boolean would be "true" to allow changes and "false" to prohibit them.

The metamodel 400 can also include rules aiding in the proper rendering of information to the user through the user interface 122. The metamodel 400 can include an element defining the visibility of a field to the user that user interface 122 would consult to determine if the property should be included in the display being rendered. For example, a user from a corporate compliance department may not need to access all the information about a tax agency, such as whether "tax on sale" is enabled, but would need information such as a registration number and the frequency of payments to the tax agency. In such a case, the unnecessary data fields 244 in the entity schema 240, such as "tax on sale," would have corresponding "display" fields in the metamodel 400 set to "false." Thus, the user interface 122 could not accurately render and interpret data without the metamodel 400.

VCR 150 returns the matching entity schema 240 to the response generator 230 in API service 132 after inserting the metamodel 400.

Response generator 230 uses the entity schema 240 to accomplish the actions in the user request by accessing one or more services provided service servers 140. Response generator 230 constructs a request for service by processing the entity schema 240 and the actions in the user request and sends the service request to a service server 140 through network 110.

Service server 140 includes an application server 160 running a service engine 162 and a data store 170 that contains user data 172. In an embodiment, a service server 140 is configured to maintain data and process workflows related a department or workflow. For example, a service server 140 may maintain inventory records for a warehouse and would process transactions related to inventory data. A separate service server 140 may maintain records related to billing and accounts receivable and would maintain invoicing and payment records and process transactions related to those records. Service engine 162 receives and processes requests from the API service 132, including accessing user data 172 in data store 170 when necessary. The entity schema 240 is presented to the service engine 162 with the action the service engine 162 is instructed to perform, and the service engine 162 performs any required processing, updates records in the data store 170, generates a service response 250, and returns service response 250 to the response generator 230. The service engine 162 may also validate requested actions using the rules from metamodel 400 included in the entity schema 240. For example, a service engine 162 configured to maintain accounts receivable information could receive a request to create a new invoice, including an entity schema defining the fields required for invoices of this user. The service engine 162 creates a new entry in data store 170 and a service response 250 including confirmation that the new invoice was created and data values for the new invoice fields.

In an alternative embodiment, request parser 210 of API service 132 extracts context data 220 and sends the context data 220 to response generator 230. The response generator 230 includes the context data 220 in the service request to the one or more service servers 140. The service engine 162 presents the context data 220 to the VCR 150, which returns the matching entity schema 240 as described above. The service engine 162 processes the service request using the entity schema 240 and returns the service response 250 to the response generator 230.

In some embodiments, response generator 230 requests services from a partner application. A partner application can be an independent application with its own API interface for accessing data and processing functions. For example, partner applications include but are not limited to payroll systems, logistics management systems, or inventory management systems maintained by independent service providers. Response generator 230 can communicate with partner applications directly, or in some embodiments, may send requests to a partner adapter configured to translate requests from the response generator 230 into the API schema used by the partner application.

Response generator 230 receives any partner response 260 from any partner applications required by the user request. Response generator 230 builds a request response for the user interface 122 after receiving a service response 250 from each service server 140 and a partner response 260 from each partner application. The request response includes data from the service responses 250 and partner responses 260 related to the data fields 244 of the entity schema 240 and constraints for those data fields 244 in the metamodel 400.

Figure 6:
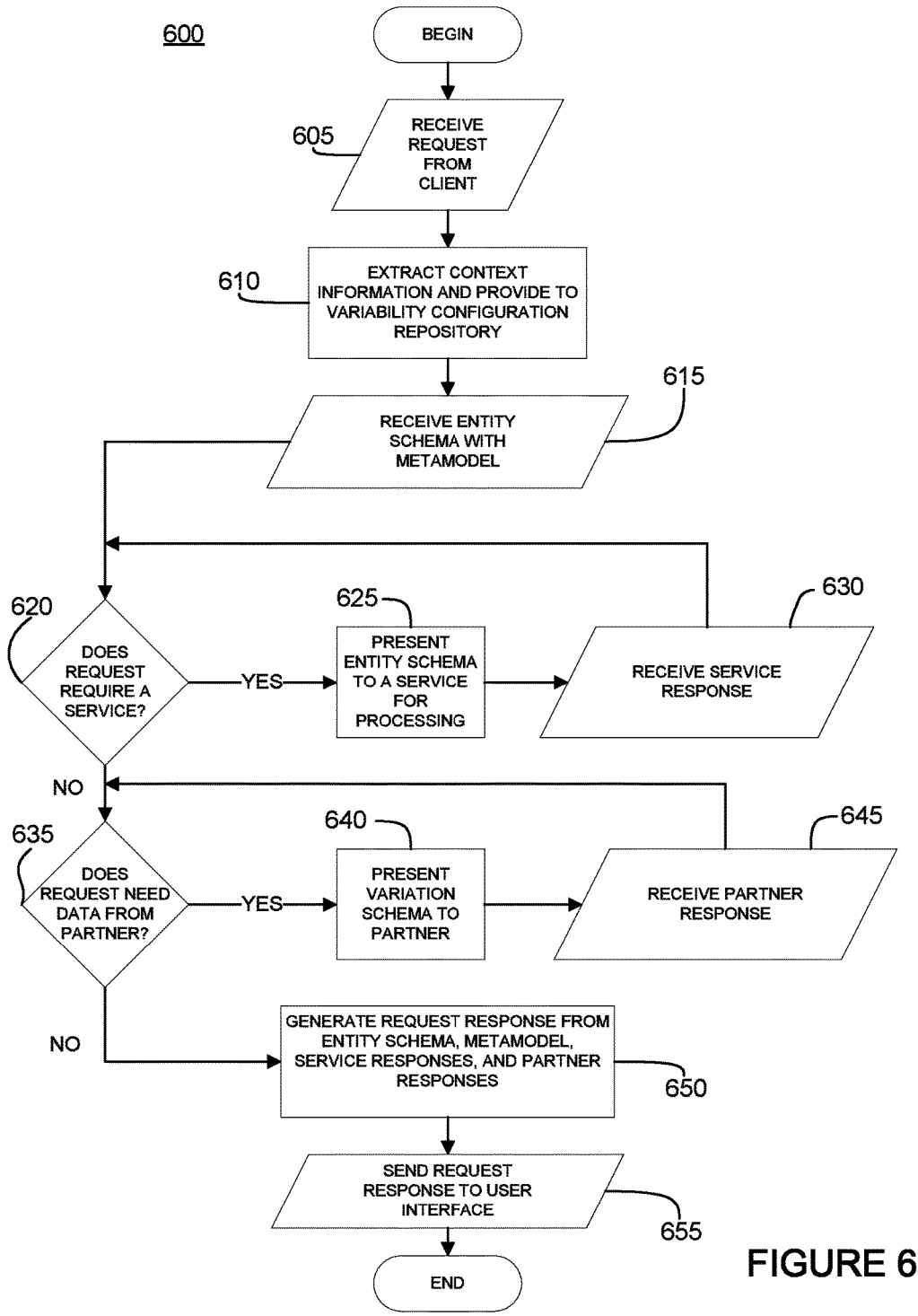
FIG. 6 illustrates example operations for an example API server processing a request from a user to generate a response, according to one embodiment.

FIG. 6 illustrates example operation flowchart 600 for an example API server processing a request to generate a response, according to one embodiment. In step 605, API service 132 receives a request from the user interface 122. In step 610, request parser 210 of API service 132 determines the context data 220 for the request and provides it to VCR 150. In step 615, API service 132 receives the entity schema 240 including the metamodel 400. In step 620, request parser 210 of API service 132 determines whether the request requires a service from a service server 140. If so, at step 630 the response generator 230 sends a request for service to the service engine 162 of the required service server 140. At step 635, response generator 230 receives a service response 250 from the service engine 162. Request parser 210 again evaluates whether a service from a service server 140 is required, as shown in step 620, and steps 625 and 630 are repeated until request parser 210 determines no additional services are required. At step 635, request parser 210 determines whether the request requires a service from a partner application. If so, at step 640, response generator 230 sends a request for service to the partner application, and at step 645 receives a partner response 260. Request parser 210 again evaluates the request to determine if another service is required from a partner application, and steps 640 and 645 are repeated until the request parser 210 determines no additional partner services are required. At step 650, response generator 230 creates a request response from the entity schema 240, metamodel 400, service response 250, and partner response 260, if any. At step 655, response generator 230 sends the request response to user interface 122 through network 110.

Figure 7:
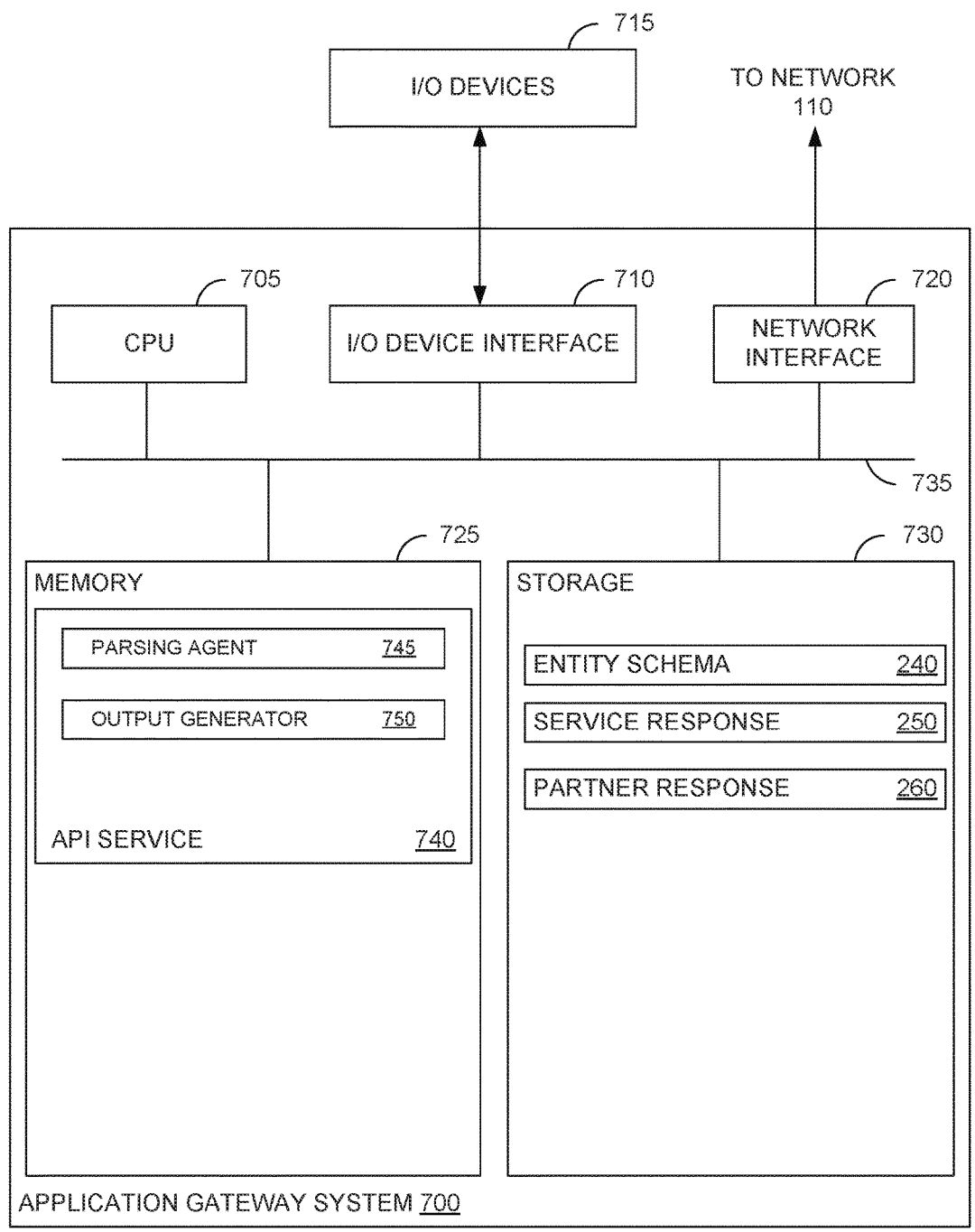
FIG. 7 illustrates an example computing system for processing a request from a user to generate a response using an API service, according to one embodiment.

FIG. 7 illustrates an example computing system for processing a request from a user to generate a response using an API service, according to one embodiment. As shown, the system 700 includes, without limitation, a central processing unit (CPU) 705, one or more I/O device interfaces 710 which may allow for the connection of various I/O devices 715 (e.g. keyboards, displays, mouse devices, pen inputs, etc.) to the system 700, network interface 720, a memory 725, storage 730, and an interconnect 735.

CPU 705 may retrieve and execute programming instructions stored in the memory 725. Similarly, the CPU 705 may retrieve and store application data residing in memory 725. The interconnect 735, transmits programming instructions and application data, among the CPU 705, I/O device interface 710, network interface 720, memory 725, and storage 730. CPU 705 is included to be representative of a single CPU, multiple CPUs, a single CPU having multiple processing cores, and the like. Additionally, the memory 725 is included to be representative of a random access memory. Furthermore, the storage 730 may be a disk drive, solid state drive, or a collection of storage devices distributed across multiple storage systems. Although shown as a single unit, the storage 730 may be a combination of fixed and/or removable storage devices, such as fixed disc drives, removable memory cards or optical storage, network attached storage (NAS), or a storage area-network (SAN).

As shown, memory 725 includes API service 740 with a parsing agent 745 and output generator 750. Parsing agent 745 is generally configured to process a request received from a user interface 122 of a client device 120 by determining context data 220 for the request, and providing the context data 220 to a VCR 150 through network 110. Parsing agent 745 further processes a request by determining which, if any, services are required to complete the request, and which, if any, partner services are required to complete the request. API service 740 receives an entity schema 240 that includes a metamodel 400 from the VCR 150 in response to the context data 220.

Entity schema 240 is presented with a request for service to the service engine 162 of the service server 140 for any services identified by the parsing agent 745. Each service engine 162 provides a service response 250 including the result of the request for service and any related data values. The service response 250 can be maintained in memory 725 or maintained in storage 730, as shown. Entity schema 240 is presented with a partner service request to any partner applications identified by the parsing agent 745. Each partner application provides a partner response 260 including the result of the request for service and any related data values. The partner response 260 can be maintained in memory 725 or maintained in storage 730, as shown.

Output generator 750 creates a request response from entity schema 240, metamodel 400, any service responses 250, and any partner responses 260. Output generator 750 sends the request response through network 110 to the user interface 122 for rendering and display to the user.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for providing data services through an application programming interface (API) comprising:
   receiving, from a client device, a request to initiate a data operation;
   determining context data associated with the request to initiate the data operation, wherein the context data comprises information about a user invoking the data operation and an organization with which the user is associated;
   retrieving an entity schema based on the context data, wherein the entity schema includes a metamodel defining allowed actions for the user with respect to the data operation, data validation rules for data included in the request to initiate the data operation, and data processing rules for processing the data operation for a use case associated with the context data determined from the request to initiate the data operation;
   processing the request to initiate the data operation using the entity schema by:
      validating that the data operation specified in the request to initiate the data operation comprises an allowed action for the user according to the allowed actions for the user defined in the metamodel,
      validating that data included as user input in the request to initiate the data operation complies with the data validation rules, wherein the data validation rules indicate a format of the data and required data fields for the data operation, and
      interpreting and processing the data included as user input in the request to initiate the data operation according to the data processing rules;
   generating a response including the entity schema; and
   returning the response to the client device.

2. The method of claim 1, wherein the context data comprises at least one of a user identifier, user authentication credentials, business department and user permissions, account identifier, geographic location, business type and business size.

3. The method of claim 1, wherein the entity schema includes a plurality of data fields, each data field having a data type and a description.

4. The method of claim 3, wherein processing the request includes presenting the entity schema to a service server and receiving a service response.

5. The method of claim 4, wherein the service server is selected from a plurality of service servers based on the entity schema.

6. The method of claim 1, wherein the metamodel includes a constraint limiting operations that can be performed on the entity schema.

7. The method of claim 1, wherein processing the request includes presenting the entity schema to a partner application and receiving a partner response.

8. The method of claim 1, wherein generating the response includes an allowed operation as a permission in the metamodel.

9. A system, comprising:
   a processor; and
   memory storing instructions which, when executed on the processor, perform an operation for providing data services through an application programming interface (API), the operation comprising:
      receiving, from a client device, a request to initiate a data operation;
      determining context data associated with the request to initiate the data operation, wherein the context data comprises information about a user invoking the data operation and an organization with which the user is associated;
      retrieving an entity schema based on the context data, wherein the entity schema includes a metamodel defining allowed actions for the user with respect to the data operation, data validation rules for data included in the request to initiate the data operation, and data processing rules for processing the data operation for a use case associated with the context data determined from the request to initiate the data operation;
      processing the request using the entity schema by:
         validating that the data operation specified in the request to initiate the data operation comprises an allowed action for the user according to the allowed actions for the user defined in the metamodel,
         validating that data included as user input in the request to initiate the data operation complies with the data validation rules, wherein the data validation rules indicate a format of the data and required data fields for the data operation, and
         interpreting and processing the data included as user input in the request according to the data processing rules;
      generating a response including the entity schema; and
      returning the response to the client device.

10. The system of claim 9, wherein the context data comprises at least one of a user identifier, user authentication credentials, business department and user permissions, account identifier, geographic location, business type and business size.

11. The system of claim 9, wherein the entity schema includes a plurality of data fields, each data field having a data type and a description.

12. The system of claim 11, wherein processing the request includes presenting the entity schema to a service server and receiving a service response.

13. The system of claim 12, wherein the service server is selected from a plurality of service servers based on the entity schema.

14. The system of claim 9, wherein processing the request further includes presenting the entity schema to a partner application and receiving a partner response.

15. The system of claim 9, wherein the metamodel includes a constraint limiting operations that can be performed on the entity schema.

16. The system of claim 9, wherein generating the response includes an allowed operation as a permission in the metamodel.

17. A non-transitory computer-readable medium comprising instructions which, when executed by one or more processors, performs an operation for providing data services through an application programming interface (API), the operation comprising:
   receiving, from a client device, a request to initiate a data operation;
   determining context data associated with the request to initiate the data operation, wherein the context data comprises information about a user invoking the data operation and an organization with which the user is associated;
   retrieving an entity schema based on the context data, wherein the entity schema includes a metamodel defining allowed actions for the user with respect to the data operation, data validation rules for data included in the request to initiate the data operation, and data processing rules for processing the data operation for a use case associated with the context data determined from the request to initiate the data operation;
   processing the request using the entity schema by:
      validating that the data operation specified in the request to initiate the data operation comprises an allowed action for the user according to the allowed actions for the user defined in the metamodel,
      validating that data included as user input in the request to initiate the data operation complies with the data validation rules, wherein the data validation rules indicate a format of the data and required data fields for the data operation, and
      interpreting and processing the data included as user input in the request according to the data processing rules;
   generating a response including the entity schema; and
   returning the response to the client device.

18. The non-transitory computer-readable medium of claim 17, wherein the context data comprises at least one of a user identifier, user authentication credentials, business department and user permissions, account identifier, geographic location, business type and business size.

19. The non-transitory computer-readable medium of claim 17, wherein processing the request includes presenting the entity schema to a service server and receiving a service response.

20. The non-transitory computer-readable medium of claim 19, wherein the metamodel includes a constraint limiting operations that can be performed on the entity schema.

* * * * *